Oct. 29, 1935.  C. C. BENNETT  2,018,910
KING PIN GAUGE
Filed April 14, 1931
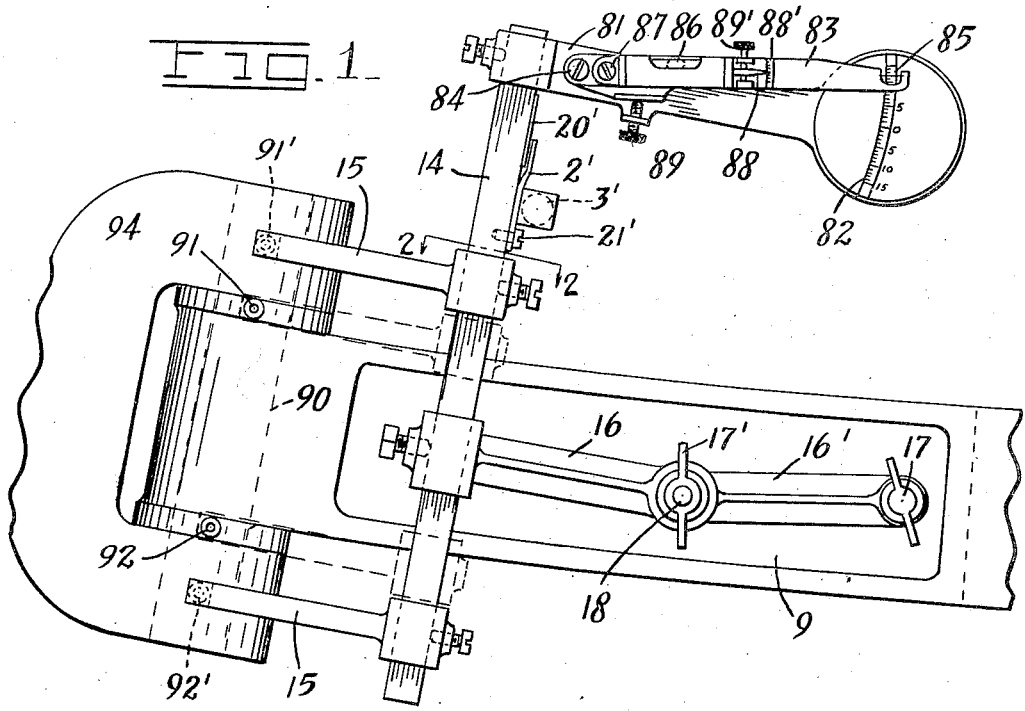
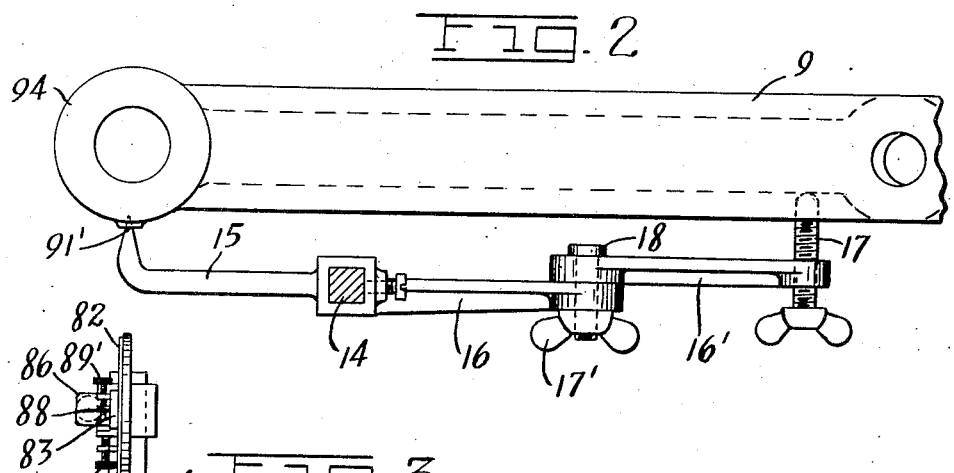
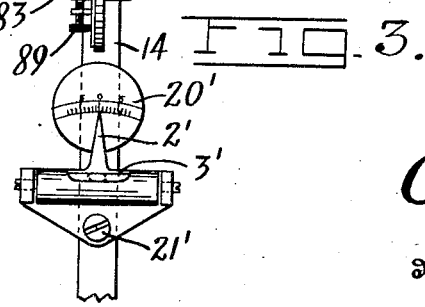
Inventor
*Claude C. Bennett*
By *Charles L. Reynolds*
Attorney Patented Oct. 29, 1935

2,018,910

UNITED STATES PATENT OFFICE 2,018,910

KING PIN GAUGE

Claude C. Bennett, Seattle, Wash., assignor to A. E. Feragen, Inc., Seattle, Wash., a corporation of Washington Application April 14, 1931, Serial No. 529,959

6 Claims. (Cl. 33—203)

My invention relates to the gauging of axles in the determination of the angle of the king pin, both as to the caster angle and the lateral angle of inclination, this being particularly pertinent as regards the caster of the axle, and for purposes of comparison, to determine if the angles of the two king pins, one at each end, are alike.

It is recognized that the front axles of automobiles should be canted slightly to give the front wheels caster, and thus to enable them to steer easier, or that the king pins, at least, should be thus canted. This must be very slight in amount, and the inclination of each of the king pins must be precisely alike or tire and wheel misalignment occur, and is evidenced in excess tire wear, hard steering, and a tendency to steer erratically. The angle of lateral inclination of each king pin should also be identical, or the steering geometry will be in error, and like results will follow.

Heretofore, so far as I am aware, it has been necessary in determining either the caster or the lateral inclination of the king pin or the king pin holes to remove the wheel from the axle, with its associated brake and steering parts, and then to gauge the king pin hole generally by means of a post inserted and centered in this hole. This was a source of inaccuracy, since the post did not always align itself precisely with the king pin axis, and moreover, the measurement was not done with parts in the position, and with the stresses applied, as would be the case in actual use. Caster, of course, has been determined without taking the wheel off of the axle, but this measurement was taken by measuring the wheel, and it has not been possible before, so far as I am aware, to measure directly the inclination of the king pin hole, for caster, or for lateral inclination, while parts were all assembled and with the same stresses and loads applied as in actual use, and it is the chief object of my invention, therefore, to provide a gauge whereby such determinations can be made, without the necessity of disassembling any part of the axle, wheel or connected parts.

It is also an object to provide a gauge designed for application to all types of axles, which will gauge directly the angle of lateral inclination of the king pin, as well as the caster angle, simultaneously.

It is a further object to provide gauges for use in such work which shall be simple, easily applied without the necessity of disassembling parts, and which will be accurate in use, within the small angular difference found in such measurements.

My invention comprises the novel apparatus and the novel arrangement thereof, as shown in the accompanying drawing, described in this specification, and as will be more particularly pointed out by the claims which terminate the same.

In the accompanying drawing I have shown my apparatus in connection with a conventional type of axle.

Figure 1 is a front elevation of an axle and steering arrangement of an automobile, with my gauge applied thereto, in position of use.

Figure 2 is a plan view on line 2—2 of Figure 1 showing the axle and my gauge applied thereto, the wheel, spindle shaft, and associated parts being omitted.

Figure 3 is a side elevation of a part of this gauge.

The disadvantage of having to remove the wheel from an automobile axle, disconnecting the brake connections, and the steering connections, and then gauging the fore-and-aft inclination of the king pin to determine caster, and the possibility of error because parts are not in the position which they occupy in use, and have not applied to them the loads which would be applied in use, is self-apparent. The disadvantage of adjusting caster by tapered shims placed between the springs and the spring perch also is apparent, and in some automobiles is not possible of accomplishment because of the type of axle, or the employment of a spring perch bolt passing through the axle from top to bottom. Accordingly, it becomes necessary to twist the axle to adjust the caster angle of the king pin hole between the king pin hole and the spring perch, or spring perch bolt, but heretofore, so far as I am aware, it has been necessary to carry out this operation, and then, after reassembling the axle, to test the wheel for caster angle by measuring the inclination of its plane when turned forward and when turned backward, and taking the difference of such measurements. If the twisting was too great or too little, the operation has to be repeated.

According to my gauging method for determining the caster and inclination angle of king pins, I apply to the axle 9 adjacent the king pin hole 90 a gauge which bears upon the axle at points on surfaces 91 and 92, found upon all axles, which points define a line that bears a definite angular relationship to the caster inclination of the king pin hole. These surfaces 91 and 92 are the edges of the axle flanges, adjacent the king pin hole, and are found to be exactly parallel to the axis of the king pin hole 90; they are the points of reference by which the axle is gauged in its manufacture, to enable the accurate boring of the king pin holes. If the four of them, two at each end of the axle, happen to be at variance with one another, in other words, not precisely in the same plane, the king pin holes at the respective ends will not be parallel, but will vary, and hence an inaccuracy of the caster angle of the king pin holes may occur in new axles. This variation will be detected by my gauge, and correction can be made.

Now, to gauge, in a plane generally normal to the axle, the inclination of the surfaces 91 and 92 relative to the vertical (which is in fact the caster angle of the king pin hole 90, because the plane defined by these surfaces 91 and 92 is parallel to the axis of the hole 90 and to the length of the axle), I may provide various indicating means.

In Figures 1, 2 and 3, I have illustrated a gauge, whereby determinations of the inclinations of the king pin may be determined, and which can be used in ascertaining the caster angle. It can also be used to measure the lateral inclination of the king pin, since there are provided means for gauging the inclination of the king pin in the vertical plane of the axle, and also its caster inclination in a plane generally normal to the axle.

In effect, this gauge comprises a mounting 14, supported by suitable means in a position parallel to the axis of the king pin 90, which mounting may take the form of a square bar, on which is supported a gauge finger 2" which is pivoted at 21' directly upon the mounting 14, or, it might be upon a member supported from the mounting, and the finger 2' moves over a scale plate 20' also secured upon the mounting, and disposed in a plane substantially normal to the axle. The bubble tube 3' upon the gauge finger 2' determines when the gauge finger 2" is upright, and the caster inclination of the king pin can be gauged, with the gauge properly applied, by the reading of the finger 2' relative to the scale plate 20', since a line joining the pivot 21 and the zero mark of the scale would be parallel to the mounting 14 and hence to the spindle axis.

To apply the gauge to the axle or to the spindle yoke 94, supported therefrom by the king pin 90, the gauge fingers 15, two of which are provided and which are adjustable lengthwise of the mounting bar 14, are applied to the reference points on the surfaces, or cups 91 and 92 upon the axle, or 91" and 92' upon the spindle yoke 94, either pair of such surfaces defining a plane parallel to the axis of the king pin 90, and, when the wheel is in the straight-ahead position, parallel to the axle. Furthermore, the lines joining the reference points on the two surfaces or cups of each pair are parallel to the king pin axis. To steady the gauge with the bar 14 parallel to the king pin axis and to form a triangular support for the same, so that a scale plate 82, to be referred to hereafter, shall be approximately parallel (precise parallelism in this respect is not essential) to the plane through the king pin axis and the axle, I provide a third contact finger 17, which is supported upon an arm preferably made up of two members 16 and 16', pivotally connected by the bolts 18, so that the outer part 16' may swing relative to the inner part 16 to accommodate the contact point 17 to axles of various shapes and bends at the end. A clamping nut 17' serves to hold parts in adjusted position, and the contact point 17 is a bolt threaded in the end of the outer part 16' of this arm, in order to provide adjustment for the end. The arm as a whole is mounted for adjustment lengthwise of the mounting bar 14.

To gauge the lateral inclination of the king pin in the vertical plane of the axle, I may provide the gauge which consists of the arm 81 normally supported in a plane parallel to the axle for adjustment lengthwise of the mounting 14, bearing the scale plate 82 at its end. An arm 83, having the gauge hair 85, cooperates with the scale upon the plate 82, being pivotally mounted at 84 upon the arm 81, and it bears the bubble tube 86, whereby the arm 83 may be brought to a level position. The inclination of the mounting 14, and consequently, of the king pin 90, may be read directly by the hair 85 upon the scale 82, for a line joining the pivot 84 and the zero mark of the scale lies in a plane perpendicular to the mounting 14. An adjusting screw 89 swings the arm 83 with relation to the arm 81.

I have shown the bubble tube 86 as pivotally supported at 87 upon the swinging or gauge arm 83, and as carrying a point 88 which is adjustable relative to a scale 88', by means of the adjusting screw 89', and this may be found desirable in various types of work in connection with the adjusting of axles, but need not be employed in this operation. In such case the pointer 88 would be left opposite the zero mark of the scale 88'. If desired, the arm 2' and scale plate 20' may be omitted and caster measurements may be made by securing the arm 81 on the bar 14 in a plane generally perpendicular to the axle, rather than in a plane parallel to the axle as shown in Figure 1. An indication of the caster would be obtained in precisely the same manner as with the pointer 2' and scale plate 20', except that the pointer is parallel to instead of perpendicular to the bubble tube, while the scale is normal to instead of parallel to the mounting bar 14. Similarly a scale and pointer of the type shown in Figure 3 could be used in place of the scale mounted on the arm 81 as shown in Figure 1.

With such a gauge as this, it is not convenient to secure the gauge to the axle while the twisting is in progress. It may be adjusted to position and applied to the axle or to the parts associated therewith, as the spindle yoke, preliminary to twisting, and if it indicates that twisting or bending is desirable, it may be laid aside and the proper twisting arms, or bending devices, as are common in the art, may be applied to the axle. When sufficient bending or twisting has been accomplished, in the judgment of the operator, the gauge is again applied to the axle, and thus, by twisting or bending and then gauging as the work progresses, and while the axle remains in the car and all parts remain associated with it, and while the weight of the car remains upon the axle and upon the wheels, the gauging and twisting progress simultaneously until the proper adjustment is indicated by the gauge.

What I claim as my invention is:—

1. In a king pin gauge, a mounting, two spaced parallel fingers thereon adapted for application to reference points in an axle and spindle assembly, whereby said mounting is disposed parallel to the king pin axis, and a third finger extending from the side of said mounting opposite said fingers for steadying contact with the axle, whereby said mounting may be held firmly in the desired position relative to the king pin axis, and gravity-controlled gauge means carried by said mounting to determine its space disposition, and therefore the space disposition of the parallel king pin axis, with respect to two vertical reference planes.

2. In a gauge as in claim 1, the third finger being formed of two parts pivotally connected for movement of the outer end to the desired point of contact on the axle.

3. In a king pin gauge, a mounting, two spaced members thereon adapted for application to reference points in an axle and spindle assembly, whereby said mounting may be disposed in a known angular relation to the king pin axis, means on said mounting for steadying engagement with the axle, whereby said mounting may readily be maintained in such relation to the king pin axis and fixed in relation to the assembly, and gauge means associated with said mounting to determine precisely its space disposition, and therefore the space disposition of the king pin axis, with respect to two known reference planes.

4. A king pin gauge comprising a mounting, two spaced fingers adapted for application to reference points in an axle and spindle assembly, which points define a reference line parallel to the king pin axis, a member supported from said mounting for steadying engagement with the axle, and a gravity-controlled gauge including a support for application to said mounting, for determining the inclination from the vertical of a plane containing said reference line and disposed parallel to the axle, such angle corresponding to the caster angle of the king pin.

5. A king pin gauge comprising a mounting, two spaced fingers adapted for application to reference points in an axle and spindle assembly, which points define a reference line parallel to the king pin axis, a member supported from said mounting for steadying engagement with the axle, and gravity-controlled gauge means including a support for application to said mounting for determining the space disposition of said reference line, by indicating the angle of inclination from the vertical of a plane containing said reference line and disposed parallel to the axle, such angle corresponding to the caster angle of the king pin axis, and the angle of inclination from the vertical of a plane containing said reference line and disposed so that a horizontal line in such plane is perpendicular to the axle, such latter angle corresponding to the lateral inclination angle of the king pin axis.

6. A king pin gauge comprising a mounting, two spaced fingers adapted for application to reference points in an axle and spindle assembly, which points define a reference line parallel to the king pin axis, and gravity-controlled gauge means including a support for application of said mounting for determining the space disposition of said reference line, by indicating the angle of inclination from the vertical of a plane containing said reference line and disposed parallel to the axle, such angle corresponding to the caster angle of the king pin axis, and the angle of inclination from the vertical of a plane containing said reference line and disposed so that a horizontal line in such plane is perpendicular to the axle, such latter angle corresponding to the lateral inclination angle of the king pin axis.

CLAUDE C. BENNETT.